United States Patent
Tzeng et al.

(10) Patent No.: US 10,853,553 B1
(45) Date of Patent: Dec. 1, 2020

(54) VIAS WITH MULTICONNECTION VIA STRUCTURES

(71) Applicant: Avatar Integrated Systems, Inc., Santa Clara, CA (US)

(72) Inventors: Ping-San Tzeng, Fremont, CA (US); Mingsheng Han, Fremont, CA (US); Yucheng Wang, Cupertino, CA (US)

(73) Assignee: Avatar Integrated Systems, Inc., Santa Clara, CA (US)

( * ) Notice: Subject to any disclaimer, the term of this patent is extended or adjusted under 35 U.S.C. 154(b) by 0 days.

(21) Appl. No.: 16/434,624

(22) Filed: Jun. 7, 2019

(51) Int. Cl.
| | |
|---|---|
| *G06F 30/398* | (2020.01) |
| *G06F 30/392* | (2020.01) |
| *G06F 30/394* | (2020.01) |
| *H01L 23/528* | (2006.01) |
| *H01L 23/522* | (2006.01) |
| *G06F 115/10* | (2020.01) |

(52) U.S. Cl.
CPC .......... *G06F 30/398* (2020.01); *G06F 30/392* (2020.01); *G06F 30/394* (2020.01); *H01L 23/5226* (2013.01); *H01L 23/5283* (2013.01); *G06F 2115/10* (2020.01)

(58) Field of Classification Search
CPC .... G06F 30/398; G06F 30/392; G06F 30/394; G06F 2115/10; H01L 23/5226; H01L 23/5283
See application file for complete search history.

(56) References Cited

U.S. PATENT DOCUMENTS

| | | | | |
|---|---|---|---|---|
| 8,302,051 B2* | 10/2012 | Tsunoda | ................ | G06F 30/367 716/111 |
| 8,418,109 B2* | 4/2013 | Nishimuda | ......... | H01L 23/5226 257/774 |
| 2003/0229862 A1* | 12/2003 | Li | ......................... | G06F 30/398 716/112 |
| 2005/0160391 A1* | 7/2005 | Orita | ..................... | G06F 30/394 326/80 |
| 2008/0141208 A1* | 6/2008 | Hirota | ..................... | G06F 30/39 716/112 |
| 2012/0286822 A1* | 11/2012 | Madurawe | .............. | G06F 30/39 326/41 |
| 2015/0213185 A1* | 7/2015 | Hensel | .................. | G06F 30/398 716/112 |
| 2018/0174965 A1* | 6/2018 | Kamineni | ......... | H01L 21/76882 |

* cited by examiner

*Primary Examiner* — Stacy Whitmore
(74) *Attorney, Agent, or Firm* — Van Pelt, Yi & James LLP

(57) ABSTRACT

Improving an initial via in a circuit comprises: obtaining layout information associated with an initial via structure in a circuit, the initial via comprising an initial lower metal enclosure and an initial upper metal enclosure connected by an initial cut; determining layout information associated with a multiconnection via structure comprising a plurality of sibling vias having at least one additional upper metal enclosure and at least one additional lower metal enclosure; updating the layout information associated with the initial via with the layout information associated with the multiconnection via structure; and outputting the updated layout information. The plurality of sibling vias are connected by a plurality of corresponding sibling cuts, and the multiconnection via structure has lower resistance than the initial via structure. In some embodiments, the multiconnection via is efficiently represented in using a master template.

19 Claims, 11 Drawing Sheets

590 ⤴ ns. FIG. 3
VIAS WITH MULTICONNECTION VIA STRUCTURES

BACKGROUND OF THE INVENTION

Modern semiconductor circuit chips have many interconnected metal wires and conducting vias that connect the metal wires on different layers. FIG. 1 is a cross sectional view of a portion of an example circuit that includes a via. In this example, layer 106 is an insulating layer. A cut 108 is made in layer 106 and filled with conductive material. A piece of metal 102 (referred to as the upper enclosure) and a piece of metal 104 (referred to as the lower enclosure) are physically separated by layer 106 but electrically connected by the filled cut to form a conductive structure, via 110. Wires on top or bottom of layer 106 can be connected to enclosures 102 or 104 and become electrically connected.

FIG. 2 illustrates a top view of the circuit portion of FIG. 1. Metal enclosures 102 and 104 are connected by cut 108 to form via 100. The enclosures are connected to metal wires in the circuit. Due to their small size, the vias are prone to defects during the manufacturing process, which can cause the connection or the entire circuit to fail. Improving the reliability of connecting vias or the manufacturing yield is thus an important aspect of circuit design. Some of the common techniques for improving via reliability involve replacing single vias with redundant vias in the circuit. Such techniques typically require enlarged enclosures, which can cause manufacturing problems and are often impractical for advanced processing technology such as 7 nm process. Further improvements are therefore needed for reducing via resistance and increasing reliability, especially when designing vias for advanced processing technology.

BRIEF DESCRIPTION OF THE DRAWINGS

Various embodiments of the invention are disclosed in the following detailed description and the accompanying drawings.

DETAILED DESCRIPTION

Figure 1:
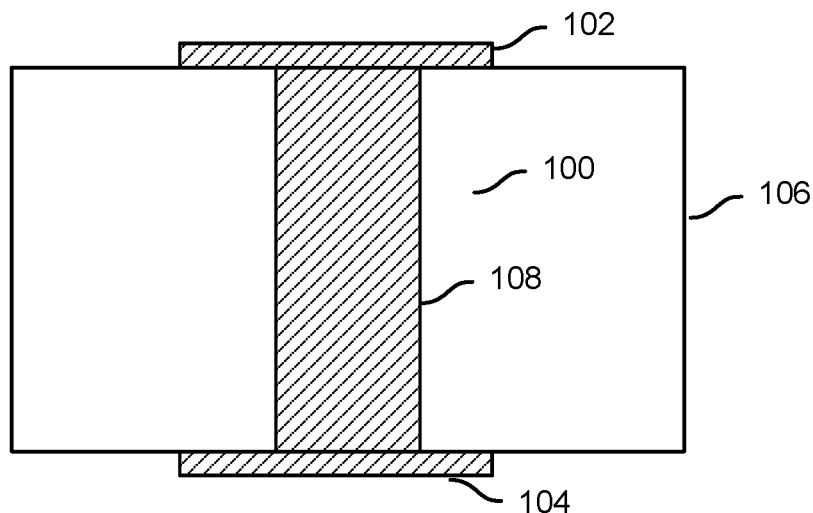
FIG. 1 is a cross sectional view of a portion of an example circuit that includes a via.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using multiconnection via structures to improve existing circuit designs is disclosed. The technique includes: obtaining layout information associated with an initial via structure in a circuit, the initial via comprising an initial lower metal enclosure and an initial upper metal enclosure connected by an initial cut; determining layout information associated with a multiconnection via structure comprising a plurality of sibling vias having at least one additional upper metal enclosure and at least one lower metal enclosure; wherein: the plurality of sibling vias are connected by a plurality of corresponding sibling cuts; and the multiconnection via structure has lower resistance than the initial via structure; updating the layout information associated with the initial via with the layout information associated with the multiconnection via structure; and outputting the updated layout information. In some embodiments, the multiconnection via structure is efficiently represented in memory and/or database storage based on the original single cut via structure with additional data indicating its configuration.

Figure 2:
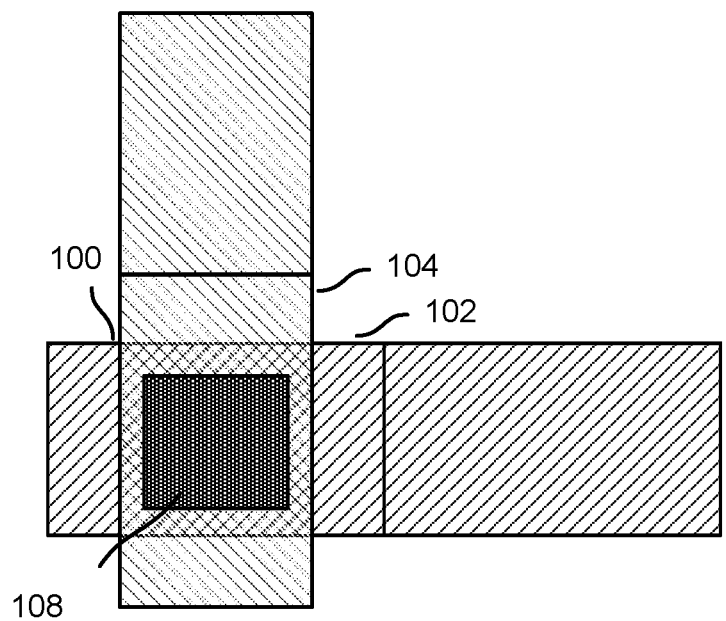
FIG. 2 illustrates a top view of the circuit portion of FIG. 1.
Figure 3:
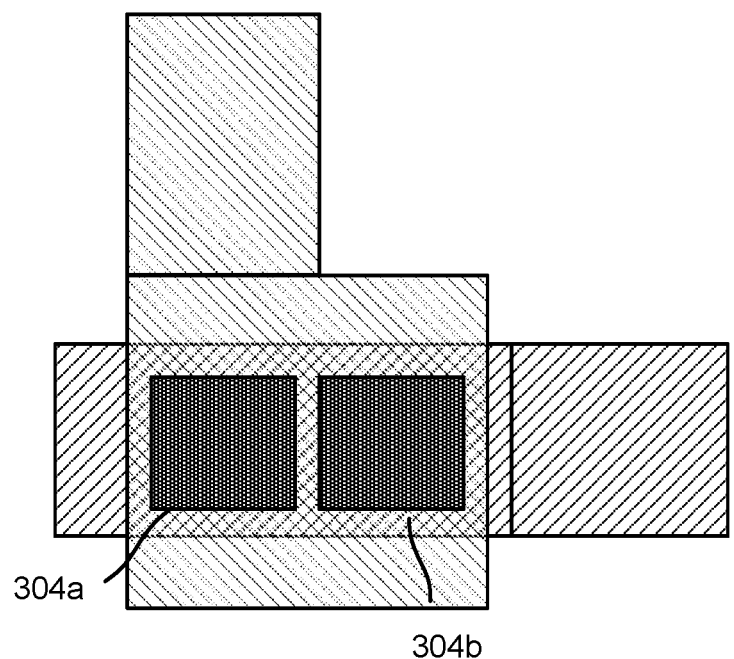
FIG. 3 is a top view of an example circuit illustrating a conventional redundant via structure.

A common technique for improving via reliability is to replace single vias in the circuit with redundant vias. FIG. 3 is a top view of an example circuit illustrating a conventional redundant via structure that brings improvements to the via structure of FIG. 2. The technique shown in FIG. 3 is often employed in older semiconductor manufacturing processes (e.g., 20 nm technology).

In FIG. 3, a pair of redundant vias replaces the original via 302. Cuts 304*a* and 304*b* share lower and upper metal enclosures to ensure connectivity. The double cuts reduce resistance and improve reliability. However, the double cut via also requires enlarged enclosure metals. These enlarged enclosures, when connected to wires, create irregular metal patterns, both in size and shape. Such irregularity in the layout can cause significant problems in manufacturing. Further, in newer manufacturing processes employing 7 nm technology or less, this traditional via improvement technique is often impractical because the design rules used in these newer processes are much more complicated. Layout changes from double cut or enlarged metal enclosure will often result in design rule violations, and therefore are often impractical for via optimization of a design.

Figure 4A:
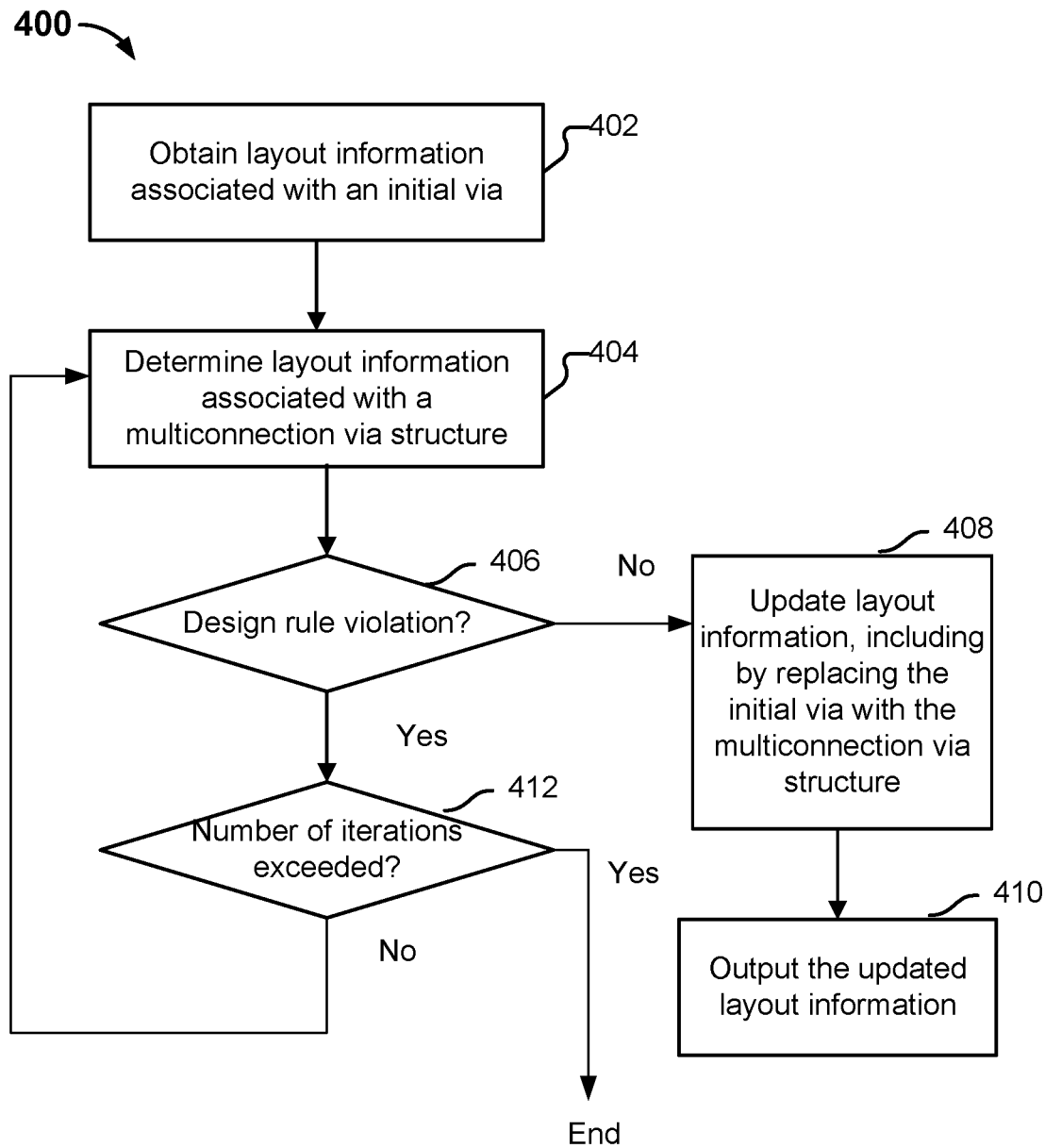
FIG. 4A is a flowchart illustrating an embodiment of a process for improving an initial via in a circuit.

FIG. 4A is a flowchart illustrating an embodiment of an optimization process for improving a via design in a circuit. Process 400 can be implemented on a computer system such as 800 of FIG. 8, and can be used to implement place-and-route systems such as 602 of FIG. 6, 704 of FIG. 7, etc. Process 400 is suitable for manufacturing processes using 7 nm or less technology. The process creates a multiconnection via structure based on an initial via structure.

At 402, layout information associated with an initial via in a circuit is obtained from the routing stage in the place-and-route process. The initial via can be a via similar to 100 of FIG. 1 or 300 of FIG. 3A. The initial via includes an upper metal enclosure, a lower metal enclosure, and a single cut that is filled with metal. The metal enclosures are connected by the cut. In some embodiments, layout information of the circuit is the output by a circuit placement-and-route system such as 602 of FIG. 6 The circuit layout information includes location and geometry information of the wires (e.g., coordinates, size) as well as location and geometry information of the vias connecting the wires. In various embodiments, the layout information is generated by router in the place-and-route process, or read in from a previously saved file. Specific layout information associated with an initial via structure (e.g., enclosure locations and geometries, cut locations and geometries, etc.) can be obtained from the overall circuit layout information.

At 404, layout information associated with a multiconnection via structure is determined. The multiconnection via structure, also referred to as sibling via structure, includes additional vias as well as the initial via, and all these vias are electrically connected. In some embodiments, the multiconnection via is efficiently represented by instantiating a master template that is based on the original single cut master and additional configuration data (e.g., extra bits) indicating the sibling configuration. The multiconnection via structure provides lower resistance and greater reliability. There are several ways to generate such a multiconnection structure in a place-and-route system. In some embodiments, the multiconnection via structure is selected from a plurality of pre-defined structures. In some embodiments, the multiconnection via structure is determined based on the location of the initial via. Details of these techniques are described below in connection with FIGS. 4A-4B and FIGS. 5A-5H.

The optimization process aims to replace the single via with a muliconnection via structure so that the finished structure is free of any design rule violation. At 406, it is checked whether any design rules are violated. The multiconnection via structure and/or the circuit incorporating the multiconnection via structure are checked against standard design rules for the circuit. As one example, a design rule can require the spacing between two adjacent wires to meet a minimum distance.

If no design rule is violated, at 408, the whole structure is deemed to be design rule-clean, and the layout information is accepted, updated, and/or saved. Specifically, the update includes replacing the layout information of the initial via in the circuit with the layout information of the determined multiconnection via structure. In some embodiments, the update replaces a data structure representing the single via (referred to as the single via master) with a corresponding data structure representing a sibling via (referred to as the sibling via master). Since the data structures are comparable in size, the replacement requires little extra memory. In some embodiments, the layout information of the multiconnection via structure replaces the layout information of the initial via. At 410, the updated layout information is output. The updated layout information can be stored, sent to another processing stage, etc.

If, however, at 406 it is determined that there is at least one design rule violation, the process returns to 404, another multiconnection via structure (e.g., one with additional vias in different locations) is determined and 404-408 repeats for a pre-specified number of iterations until a multiconnection via structure that does not result in any design rule violation is found. For example, a different pre-specified multiconnection via configuration can be selected among a set of pre-specified configurations, or another multiconnection via configuration can be determined on the fly, based on properties such as number of cuts, spacing, location of the initial cut, etc. If after a pre-specified number of tries there are still violations, the process ends and the initial via will not be replaced. The overall optimization process to which process 400 is a part can move on to the next via or perform other tasks.

Figure 4B:
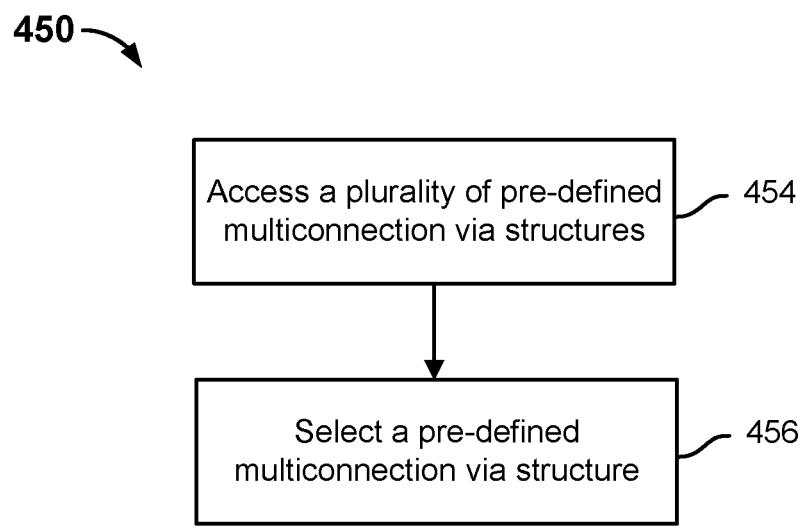
FIG. 4B is a flowchart illustrating an embodiment of a process for generating layout information associated with the multiconnection via structure.

In some embodiments, pre-defined multiconnection via structures are used to select a multiconnection via structure that replaces the initial via. FIG. 4B is a flowchart illustrating an embodiment of a process for generating layout information associated with a multiconnection via structure. Process 450 can be used to implement 404 of process 400.

In this example, at 452, a plurality of pre-defined multiconnection via structures is accessed. The pre-defined multiconnection via structures can be provided by a place-and-route database that stores information about various objects used in place-and-route operations. As will be explained in more detail below in connection with FIGS. 5A and 5B, these pre-defined structures include multiple vias derived based on the initial via. The derived vias have the same size as the initial via, and includes a via at the same location as the initial via (or equivalently, includes the initial via). The pre-defined multiconnection via structures are specified in such a way that they have no design rule violations on their own, although design rule violation checks should still be performed when a multiconnection via structure is incorporated into a circuit.

At 454, a pre-defined multiconnection via structure is selected. The selection can be made according to a pre-defined order.

Figure 5A:
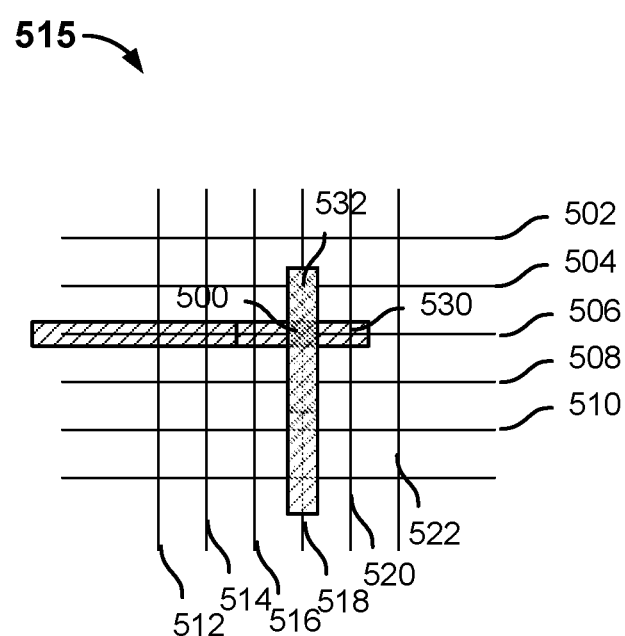
FIG. 5A is a top view illustrating an example of an initial via structure.

FIG. 5A is a top view illustrating an example of an initial via structure. In this example, wires are laid out on pre-defined tracks (such as horizontal tracks 502-510 or vertical tracks 512-522). The tracks align the wires and guarantee certain minimum separation between adjacent wires. Tracks in different metal layers can have different orientations. As shown, a via is formed at 500. Its upper metal enclosure 530 is placed on track 506 which is along the horizontal direction, and the lower metal enclosure 532 is placed on track 518 which is along the vertical direction.

FIG. 5B-5G illustrate a set of pre-defined multiconnection via structure examples. These via structures are referred to as 2×2 structures as there are two rows and two columns of cuts. Three additional cuts are added next to initial cut 500 in the horizontal and vertical directions to form four possible configurations 550-580, each placing the initial cut in a different corner of a 2×2 structure. In this case, the design rule requires the enclosures in the same layer to be spaced two tracks apart. Additional enclosures on the lower and upper layers are placed on the appropriate tracks. Specifically, the resulting multiconnection via structures are shown as mesh-like structures with enclosures in the same layer spaced two tracks apart. The upper and lower enclosures in a multiconnection via structure are electrically connected. The multiconnection via structure including additional sibling vias provides lower resistance and greater redundancy than the initial, single via structure. In some embodiments, the layout information of the multiconnection via structure replaces the layout information of the initial via. In some embodiments, the initial via master is replaced with a multiconnection via master. The information that is output can be stored, sent to another processing stage, etc.

Figure 5B:
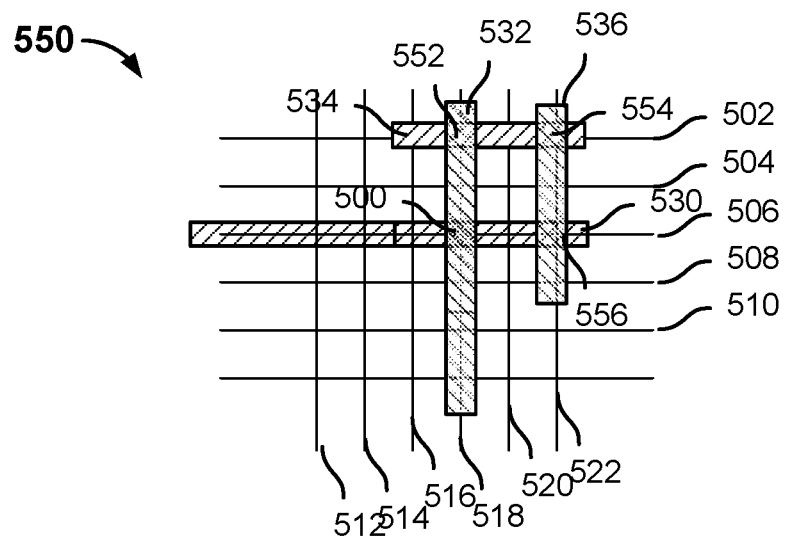
FIG. 5B-5G illustrate a set of pre-defined multiconnection via structure examples.
Figure 5C:
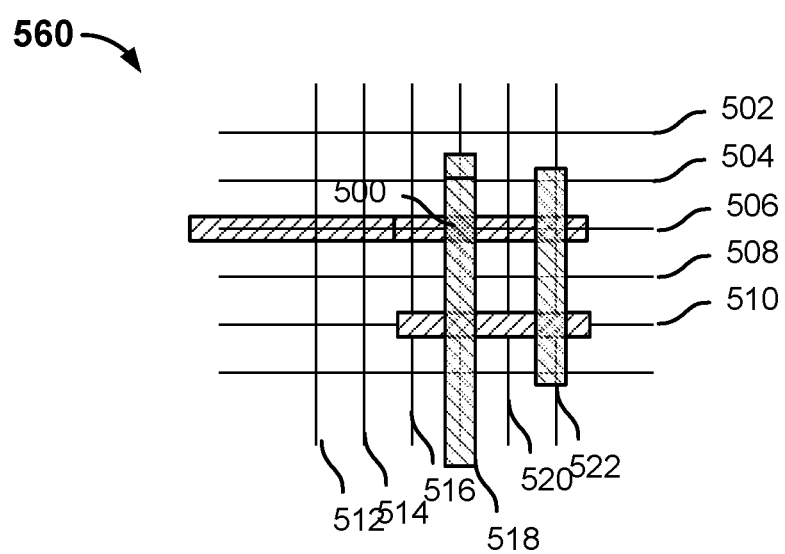
Figure 5D:
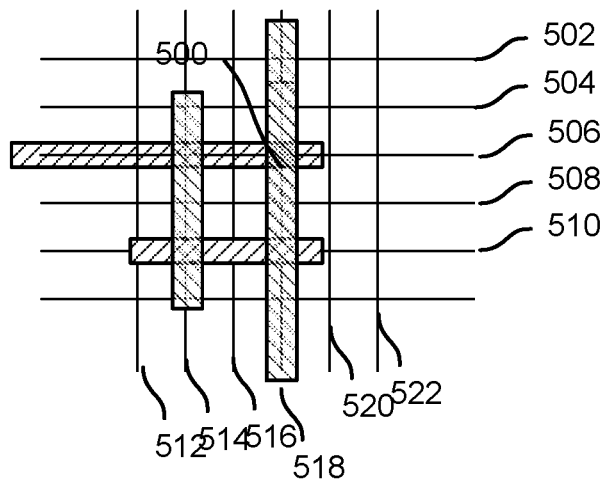
Figure 5E:
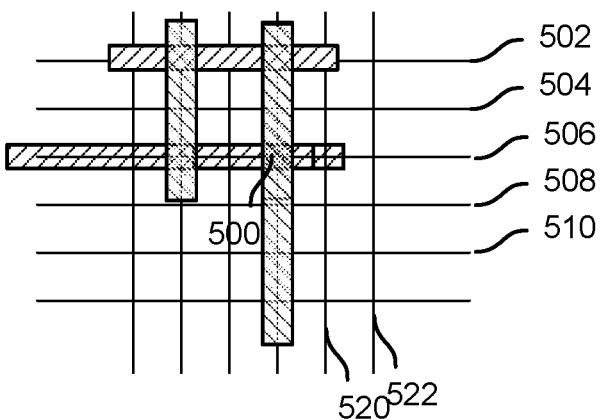

As shown in FIG. 5B, the single via is replaced with a predefined multiconnection via structure at one configuration. From layout point of view, this is equivalent to adding additional cuts at locations 552 (where additional upper enclosure 534 and initial lower enclosure 532 intersect), 554 (where additional upper enclosure 534 and additional lower enclosure 536 intersect), and 556 (where initial upper enclosure 530 and additional lower enclosure 536 intersect). The lengths of the metal enclosures are such that the cuts are covered and a pre-defined minimum enclosure length is met. The original metal enclosures 530 and 532 can be extended as appropriate to cover the additional cuts. As shown, initial upper enclosure 530, initial lower enclosure 532, additional upper enclosure 534, and additional lower enclosure 536 form a # shape as shown. Together, these form an improved multiconnection via structure (also referred to as a sibling via structure) 550 with metal enclosures 530, 532, 534, and 536 electrically connected by vias 500, 552, 554, and 556.

In this example, due to the increased number of vias and additional connection path, the resistance of the new sibling via structure is lower than the initial via. For example, the effective resistance of configuration in FIG. 5A is reduced by about 25% in FIG. 5B. Further, the multiple vias provide redundancy such that the failure of any individual via does not cause the whole via structure to fail, thus improve manufacturing yield.

Figure 5F:
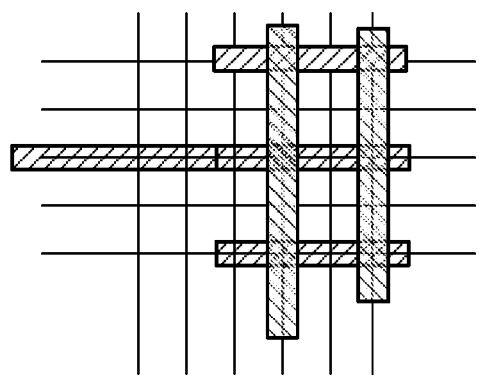
Figure 5G:
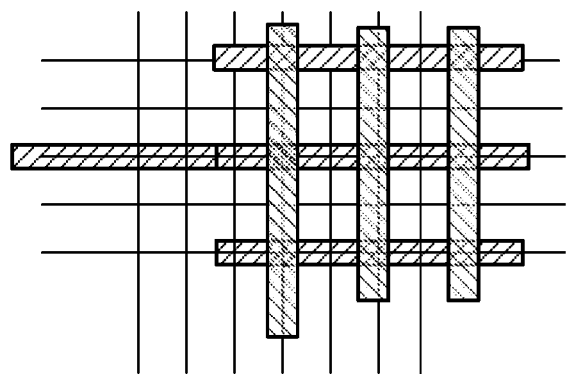

Although an improved via structure including three additional cuts is shown in this example, there can be different numbers of sibling cuts in other embodiments. For example, FIGS. 5F and 5G are diagrams illustrating examples of improved via structures with five and eight additional cuts, respectively. Different numbers of cuts can be used in other embodiments.

In some embodiments, rather than selecting from pre-defined multiconnection via structures, a new multiconnection via structure is generated as needed. For example, one or more additional upper metal enclosures and one or more additional lower metal enclosures at locations in proximity to the initial via and additional cuts between intersections can be specified. In some embodiments, the additional upper and lower metal enclosures are specified on neighboring tracks of the initial pre-defined tracks.

Figure 5H:
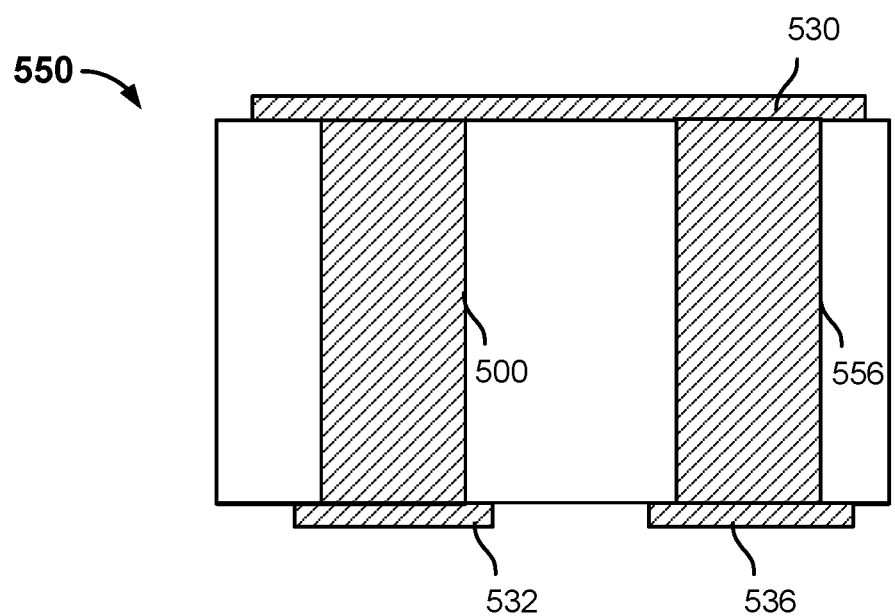
FIG. 5H is a diagram illustrating a cross sectional view of multiconnection via 550.

FIG. 5H is a diagram illustrating a cross sectional view of multiconnection via 550. Sibling cuts 500 and 556 are shown to connect initial top enclosure 530 to initial lower enclosure 532 and additional lower enclosure 536. The remaining sibling cuts and enclosures are not shown.

In designs with large numbers of vias, treating sibling cuts and enclosures in the improved multiconnection vias as separate objects and maintaining them can significantly increase the memory and storage requirements. Thus, in some embodiments, a master template (e.g., a data structure/object) is used to efficiently represent the multiconnection vias and derive the via instances. The master template includes configuration data (e.g., one or more properties represented using extra bits) that specify how to derive the multiconnection via structure based on the initial via structure. In some embodiments, the master template includes a lower sibling property and an upper sibling property that indicate the number of additional upper enclosure(s) and the number of additional lower enclosure(s) required for the multiconnection via, respectively. For example, a derived via instance whose lower sibling property and upper sibling property are both set to 0 has no additional enclosures, and corresponds to the original single via structure (e.g., structure 515 of FIG. 5A). As another example, a derived via instance whose lower sibling property and upper sibling property are both 1 has 1 additional lower enclosure and 1 additional upper enclosure, and the resulting instance corresponds to a 2×2 via structure similar to 550 of FIG. 5B. As a third example, a derived via instance whose lower sibling property is set to 1 and upper sibling property is set to 2 indicates that the structure has 1 additional lower enclosure and 2 additional upper enclosure, and the resulting instance corresponds to a 2×3 structure similar to 590 of FIG. 5F. Each sibling via in the layout is an instantiation of such a master template at a given location. For example, the configuration in FIGS. 5B, 5C, 5D, and 5E show instances of the same 2×2 master template at different locations.

In the above example, the master template is specified as:
class Via {
name;
number_of_lower_sibling;
number_of_upper_sibling;
. . . //additional properties
};

Master templates with other properties/formats can be used in other embodiments. By using such a master template, a multiconnection replacement via can be efficiently represented using the same amount of memory as the original single cut via, thus the resulting circuit with improved multiconnection vias does not require extra memory or storage.

Figure 6:
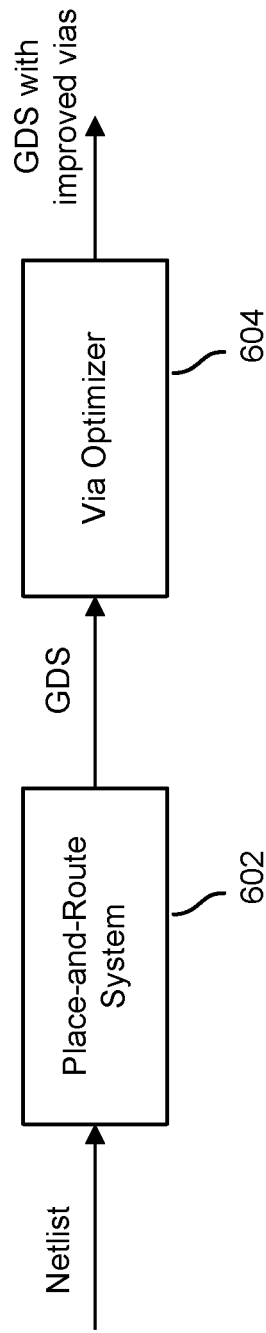
FIG. 6 is a block diagram illustrating an example place-and-route system that implements a via optimizer that performs post processing.

FIG. 6 is a block diagram illustrating an example place-and-route system that implements a post-route via optimizer. In this example, a logical circuit (e.g., a netlist) is sent to a place-and-route system 602 to generate a place-and-route result that includes cell placement and wire connections. Place-and-route system 602 can be any appropriate system (e.g., Avatar's Aprisa®) that performs the basic task of place and route. The output of the place-and-route system is sent to a via optimizer 604, which performs post processing on the place-and-route result. In this example, via optimizer 604 performs process 400 serially or in parallel to post process the vias in the place-and-route results. Sibling vias are created as appropriate. The place-and-route result is updated with the improved via structure information. In this example, the increased number of cuts in the new layout with multiconnection via does not require additional memory in database, because all such muticonnection via instances are derived from a predefined master template as the initial via.

Figure 7:
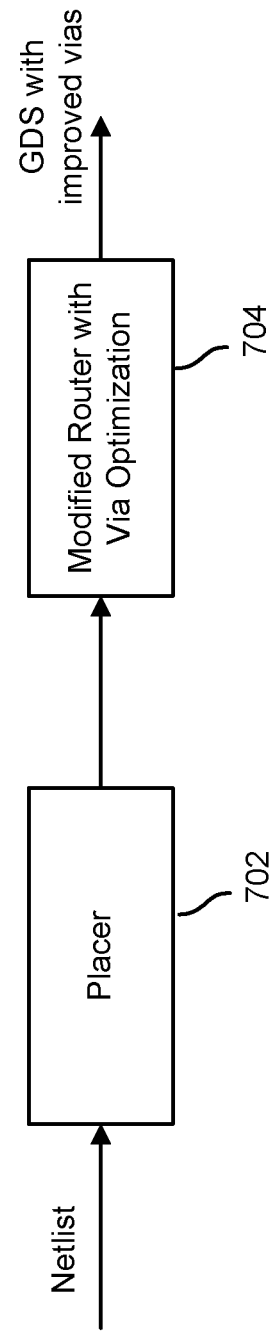
FIG. 7 is a block diagram illustrating another example place-and-route system that implements an in-route via optimizer.

FIG. 7 is a block diagram illustrating another example place-and-route system that implements an in-route via optimizer. In this example, the cell placement result from a placer 702 is sent to a via-optimization enhanced router 704. Placer 702 places the cells but does not perform routing. Via-optimization enhanced router 704 performs routing, and at the same time also takes into account of the via optimization. In other words, as router 704 determines the proper connections of the circuits, it will also examine each via and perform process 400 to replace the via with an improved via structure as appropriate. Such an in-route process can normally better balance via optimization and other routing constraints, and produce an overall better optimization result. The output of router 704 therefore includes the improved via structure information.

Figure 8:
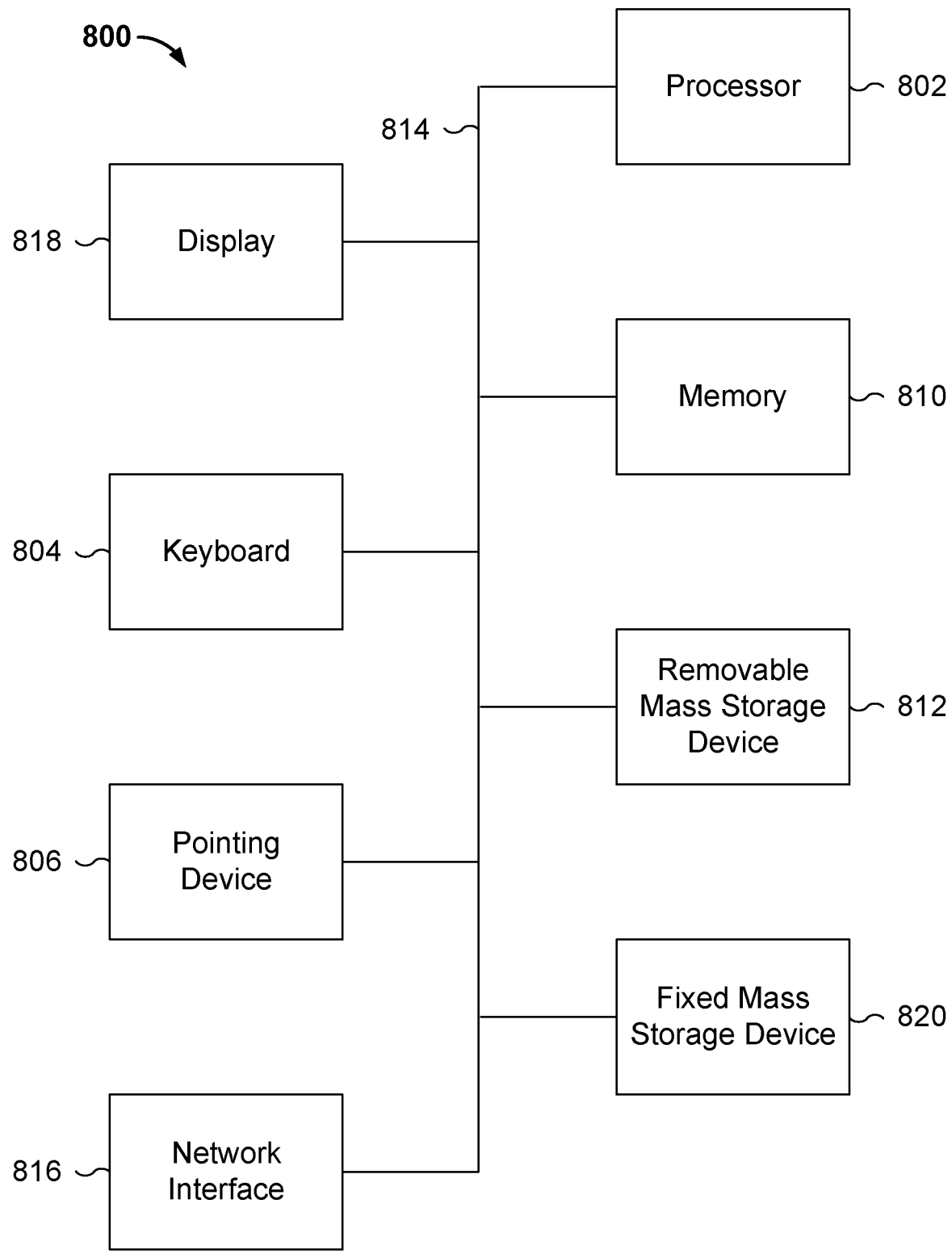
FIG. 8 is a functional diagram illustrating a programmed computer system for improving via structures in accordance with some embodiments.

FIG. 8 is a functional diagram illustrating a programmed computer system for improving via structures in accordance with some embodiments. As will be apparent, other computer system architectures and configurations can be used to improve via structures. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In some embodiments, processor 802 includes and/or is used to perform the processes described above with respect to FIGS. 4A-4B.

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining layout information associated with an initial via in a circuit, the initial via comprising an initial lower metal enclosure and an initial upper metal enclosure connected by an initial cut;

determining layout information associated with a multiconnection via structure comprising: a plurality of sibling vias having at least one additional upper metal enclosure and at least one additional lower metal enclosure, and the initial via; wherein:

the plurality of sibling vias are connected by a plurality of corresponding sibling cuts; and the multiconnection via structure has lower resistance than the initial via structure;

updating the layout information associated with the initial via with the layout information associated with the multiconnection via structure comprising the plurality of sibling vias and the initial via; and outputting the updated layout information.

2. The method of claim 1, wherein the plurality of sibling vias are electrically connected to the initial via.

3. The method of claim 1, wherein the multiconnection via structure is represented using a master template.

4. The method of claim 1, wherein:

the multiconnection via structure is represented using a master template; and the master template includes configuration data that specifies how to derive the multiconnection via structure based on the initial via structure.

5. The method of claim 1, wherein the determination of the layout information associated with the multiconnection via structure includes selecting among a plurality of pre-defined multiconnection via structures associated with the initial via.

6. The method of claim 1, wherein the determination of the layout information associated with the multiconnection via structure includes:

specifying the at least one additional upper metal enclosure and the at least one additional lower metal enclosure at locations in proximity to the initial via; and specifying at least one sibling via to electrically connect the at least one additional lower metal enclosure with the at least one additional upper metal enclosure.

7. The method of claim 1, wherein the initial upper metal enclosure is placed on an initial upper track, the initial lower metal enclosure is placed on an initial lower track, an additional upper metal enclosure of the at least one upper metal enclosure is placed on a neighboring track to the initial upper track, and an additional lower metal enclosure of the at least one lower metal enclosure is placed on a neighboring track to the initial lower track.

8. The method of claim 1, wherein wires in the circuit are specified to be 7 nm or less in width.

9. The method of claim 1, wherein the layout information is obtained from a place-and-route system that performs placement and routing of the circuit.

10. The method of claim 1, wherein the layout information is obtained from a placer that does not perform routing.

11. A system, comprising:

one or more processors configured to:

obtain layout information associated with an initial via in a circuit, the initial via comprising an initial lower metal enclosure and an initial upper metal enclosure connected by an initial cut;

determine layout information associated with a multiconnection via structure comprising: a plurality of sibling vias having at least one additional upper metal enclosure and at least one additional lower metal enclosure, and the initial via; wherein:

the plurality of sibling vias are connected by a plurality of corresponding sibling cuts; and the multiconnection via structure has lower resistance than the initial via structure;

update the layout information associated with the initial via with the layout information associated with the multiconnection via structure comprising the plurality of sibling vias and the initial via; and output the updated layout information; and one or more memories coupled to the one or more processors and configured to provide the processors with instructions.

12. The system of claim 11, wherein the plurality of sibling vias are electrically connected to the initial via.

13. The system of claim 11, wherein to determine the layout information associated with the multiconnection via structure includes to select among a plurality of pre-defined multiconnection via structures associated with the initial via.

14. The system of claim 11, wherein to determine the layout information associated with the multiconnection via structure includes to:

specify the at least one additional upper metal enclosure and the at least one additional lower metal enclosure at locations in proximity to the initial via; and specify at least one sibling via to electrically connect the at least one additional lower metal enclosure with the at least one additional upper metal enclosure.

15. The system of claim 11, wherein the initial upper metal enclosure is placed on an initial upper track, the initial lower metal enclosure is placed on an initial lower track, an additional upper metal enclosure of the at least one additional metal enclosure is placed on a neighboring track to the initial upper track, and an additional lower metal enclosure of the at least one additional lower metal enclosure is placed on a neighboring track to the initial lower track.

16. The system of claim 11, wherein wires in the circuit are specified to be 7 nm or less in width.

17. The system of claim 11, wherein the layout information is obtained from a place-and-route system that performs placement and routing of the circuit.

18. The system of claim 11, wherein the layout information is obtained from a placer that does not perform routing.

19. A computer program product, the computer program product being embodied in a tangible computer readable storage medium and comprising computer instructions for:

obtaining layout information associated with an initial via in a circuit, the initial via comprising an initial lower metal enclosure and an initial upper metal enclosure connected by an initial cut;

determining layout information associated with a multiconnection via structure comprising: a plurality of sibling vias having at least one additional upper metal enclosure and at least one additional lower metal enclosure, and the initial via; wherein:

the plurality of sibling vias are connected by a plurality of corresponding sibling cuts; and the multiconnection via structure has lower resistance than the initial via structure;

updating the layout information associated with the initial via with the layout information associated with the multiconnection via structure comprising the plurality of sibling vias and the initial via; and outputting the updated layout information.

* * * * *